United States Patent [19]

Kotani et al.

[11] 4,201,848

[45] May 6, 1980

[54] PROCESS FOR PREPARING POLYMERS HAVING HIGH MOLECULAR WEIGHT

[75] Inventors: Teizo Kotani; Takashi Inoue; Kozo Arai, all of Yokohama, Japan

[73] Assignee: Japan Synthetic Rubber Co., Ltd., Tokyo, Japan

[21] Appl. No.: 881,914

[22] Filed: Feb. 28, 1978

Related U.S. Application Data

[63] Continuation of Ser. No. 752,925, Dec. 21, 1976, abandoned.

[30] Foreign Application Priority Data

Jan. 1, 1976 [JP] Japan .................................... 51-297
Jan. 1, 1976 [JP] Japan .................................... 51-298
Jan. 1, 1976 [JP] Japan .................................... 51-299

[51] Int. Cl.$^2$ ............................................. C08F 297/04
[52] U.S. Cl. ..................................... 525/314; 526/200; 526/204; 526/211; 526/217; 526/220
[58] Field of Search ...................................... 260/880 B

[56] References Cited

U.S. PATENT DOCUMENTS

| 3,948,846 | 4/1976 | Waters | 260/880 B |
| 4,010,226 | 3/1977 | Crossland | 260/800 B |

OTHER PUBLICATIONS

Hsieh, "J. Polymer Science," Part A, vol. 3, pp. 181–190, 1965.
Kuntz et al., "J. Polymer Science," vol. XLII, pp. 299–308, 1960.
Hsieh et al., "J. Polymer Science," vol. XXVI, No. 113, pp. 240–242, 1957.

*Primary Examiner*—Paul R. Michl
*Attorney, Agent, or Firm*—Stevens, Davis, Miller & Mosher

[57] ABSTRACT

A homopolymer or copolymer having extremely high weight-average molecular weight of about 3,000,000 to about 50,000,000 with a narrow molecular weight distribution is prepared by emulsion polymerization of at least one monomer of an aromatic alkenyl compound such as styrene, an $\alpha,\beta$-unsaturated carboxylic acid ester such as methyl methacrylate, or a conjugated diolefin such as butadiene or isoprene using an initiator consisting of (a) at least one peroxide of dialkyl peroxides and peroxy esters, and (b) at least one reducing agent such as alkyl primary amines, alkyl tertiary amines, polyalkylenepolyamines, alkylamino alcohols, and the like at a temperature of 0° to 70° C.

2 Claims, 1 Drawing Figure

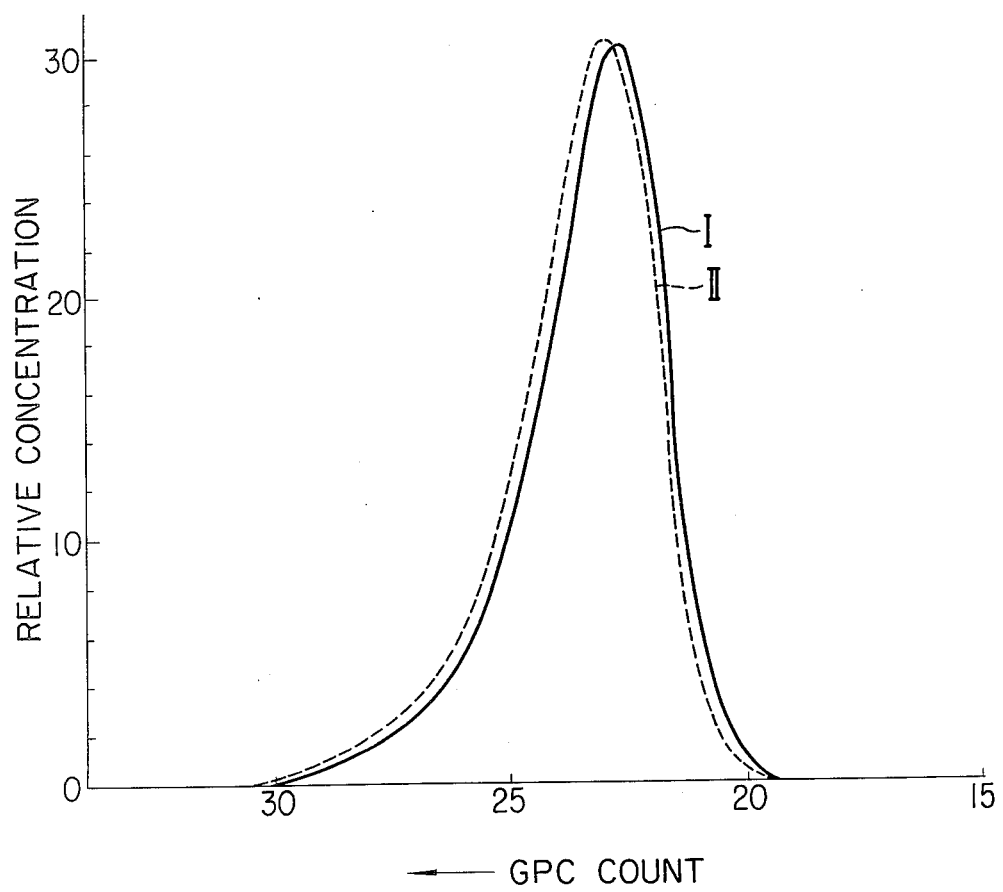

PROCESS FOR PREPARING POLYMERS HAVING HIGH MOLECULAR WEIGHT

This is a continuation of application Ser. No. 752,925 filed Dec. 21, 1976, abandoned.

This invention relates to a process for producing a homopolymer or copolymer of an aromatic alkenyl compound, $\alpha,\beta$-unsaturated carboxylic acid ester and a conjugated diolefin, having a narrow molecular weight distribution and super-high molecular weight by emulsion polymerization.

There has been known the production of polystyrene, styrene-butadiene rubber, polyisoprene, and the like by emulsion polymerization. But it has been impossible to obtain a polymer having a relatively narrow molecular weight distribution and super-high molecular weight of from millions to several ten millions by known emulsion polymerization methods. Recently, it was reported that polystyrene having super-high molecular weight was obtained by combining triethylenetetramine and the like with polypropylene powder which had been prepared by oxidizing polypropylene with ozone after removing atactic polypropylene therefrom completely, followed by hydroperoxidation (European Polymer J. 10, 551 (1974) and Makromol. Chem. 175, 2091 (1974)). But this process has difficulties in industrial production of the hydroperoxidized polypropylene and recovery thereof.

On the other hand, it is known that a polymer having a narrow molecular weight distribution can be obtained by a living anionic polymerization method. Polystyrene and the like having a narrow molecular weight distribution are commercially available as a standard sample in gel permeation chromatography for characterizing high polymers. The polystyrene seems to be obtained by polymerizing using living anions and purifying the resulting polymer using a fractional precipitation method and the like. In the living anionic polymerization method, an initiator is used in an amount inversely proportional to the molecular weight of the polymer produced. Since the initiator loses its activity by the reaction with a very small amount of impurities such as water in the polymerization system, it requires fine technique to produce polymers having super-high molecular weight of millions to several ten millions by the living anionic polymerization method and therefore the industrial scale production of such polymers was very difficult.

The present inventors have studied earnestly a process for producing polymers having a narrow molecular weight distribution and super-high molecular weight industrially easily and accomplished the present invention.

The present invention provides a process for preparing a homopolymer or copolymer having high weight-average molecular weight, $\overline{M}w$, of about 3,000,000 to about 50,000,000 with a narrow molecular weight distribution, the ratio of weight-average molecular weight, $\overline{M}w$, to number-average molecular weight, $\overline{M}n$, i.e. $\overline{M}w/\overline{M}n$ being 1 to 2, which comprises emulsion polymerizing at least one monomer selected from the group consisting of an aromatic alkenyl compound, an $\alpha,\beta$-unsaturated carboxylic acid ester and a conjugated diolefin using an initiator consisting of (a) at least one peroxide selected from the group consisting of a dialkyl peroxide having one, two or four groups of the formula:

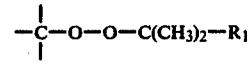

wherein $R_1$ is methyl or phenyl, in the molecule and a peroxy ester having one or two groups of the formula:

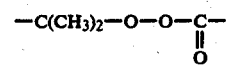

in the molecule, and (b) at least one reducing agent selected from the group consisting of an alkyl primary amine, an alkyl tertiary amine, a polyalkylenepolyamine, a polyalkyleneimine, an alkylamino alcohol, an alkyl primary amino sulfonic acid and an alkali salt thereof, a quaternary ammonium hydroxide, a quaternary ammonium bromide, hydrazine, dextrose, an alkali salt of sulfurous acid, an alkali dithionite, oxalic acid and imidazole, at a polymerization temperature of 0° to 70° C.

Since there has been no suitable decomposition accelerator for dialkyl peroxides, the latter has been used alone either for crosslinking of silicone rubber and ethylene-propylene rubber and curing of unsaturated polyesters by thermal decomposition, or for polymerizations over 100° C. (H. Warson: The Application of Synthetic Resin Emulsions, Benn, London, page 14, (1972)).

The peroxy esters which are used in the present invention as another type of peroxide have been mainly used for curing of unsaturated polyester resins and crosslinking of silicone rubber.

The present inventors have studied effect of dialkyl peroxides and peroxy esters as a polymerization initiator and found that the combination of peroxides with special reducing agents could afford homopolymers or copolymers having a narrow molecular weight distribution and super-high molecular weight by emulsion polymerization.

The dialkyl peroxides used in the present invention have one, two or four groups of the formula:

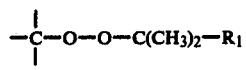

wherein $R_1$ is as defined above, in the molecule. Examples of the dialkyl peroxides having one group of the formula (i) are di-t-butyl peroxide, t-butyl cumyl peroxide, dicumyl peroxide, di-t-amyl peroxide, and the like. Examples of the dialkyl peroxides having two groups of the formula (i) are $\alpha,\alpha'$-bis(t-butylperoxy)p-diisopropylbenzene, 2,5-dimethyl-2,5-di(t-butylperoxy)hexane, 2,5-dimethyl-2,5-di(t-butylperoxy)hexyne-3, 1,1-bis(t-butylperoxy)-3,3,5-trimethyl cyclohexane, n-butyl 4,4-bis(t-butylperoxy)valerate, 2,2-bis(t-butylperoxy)butane, 1,1-di(t-butylperoxy)cyclohexane, and the like. Examples of the dialkyl peroxide having four groups of the formula (i) are 2,2-bis(4,4-di-t-butylperoxy cyclohexyl)propane, and the like. Among these dialkyl peroxides, t-butyl cumyl peroxide, 2,5-dimethyl-2,5-di(t-butylperoxy)hexane and 2,2-bis(4,4-di-t-butyl peroxy cyclohexyl)propane are particularly preferable.

The peroxy esters used in the present invention have one or two groups of the formula:

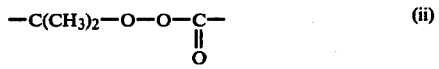

in the molecule. Examples of the peroxy esters having one group of the formula (ii) are t-butyl peroxyacetate, t-butyl peroxyisobutylate, t-butyl peroxypivalate, t-butyl peroxyneodecanoate, t-butyl peroxy 2-ethylhexanoate, t-butyl peroxy 3,5,5-trimethyl hexanoate, t-butyl peroxylaurate, t-butyl peroxybenzoate, t-butyl peroxymaleic acid, t-butyl peroxy isopropylcarbonate, and the like. Examples of the peroxy esters having two groups of the formula (ii) are di-t-butyl diperoxyphthalate, 2,5-dimethyl-2,5-di(benzoylperoxy)hexane, and the like. Among these peroxy esters, t-butyl peroxyacetate, t-butyl peroxybenzoate, t-butyl peroxymaleic acid, and t-butyl peroxy isopropylcarbonate are particularly preferable.

The use of other peroxides such as hydroperoxides, diacyl peroxides, ketone peroxides, and the like in the process of the present invention is not preferable, since the polymers produced have lower molecular weights or the yields are very low.

The amount of the peroxide used in the process of the present invention is preferably about 0.0001 to 1% by mole, more preferably 0.005 to 0.5% by mole based on the monomer used. If the amount of the peroxide is lower than 0.0001% by mole, the conversion decreases, while if the amount of the peroxide is over 1% by mole, molecular weight of the polymer produced decreases.

The reducing agents used in the process of the present invention are as follows.

As the alkyl primary amines, those having an alkyl group of 1 to 16 carbon atoms are preferably used. Examples of the alkyl primary amines are methylamine, ethylamine, propylamine, butylamine, amylamine, laurylamine, cetylamine, and the like. Examples of those having two or more amino groups in the molecule are ethylenediamine, trimethylenediamine, tetramethylenediamine, hexamethylenediamine, and the like.

As the alkyl tertiary amines, those having an alkyl group of 1 to 6 carbon atoms are preferably used. Examples of the alkyl tertiary amines are trimethylamine, triethylamine, tripropylamine, tri-n-butylamine, triamylamine, triethylenediamine, and the like.

As the polyalkylenepolyamines, there may preferably be used diethylenetriamine, triethylenetetramine, dipropylenetriamine, tripropyleneteramine, and the like.

As the polyalkyleneimines, there may preferably be used polyethyleneimine, polypropyleneimine, and the like.

As the alkylamino alcohols, those having 1 to 6 carbon atoms are preferably used. Examples of them are ethanolamine, propanolamine, n-propanolamine, isopropanolamine, diethanolamine, triethanolamine, and the like.

As the alkyl primary amino sulfonic acids and alkali salts thereof, there may preferably be used aminoethyl sulfonic acid, sodium aminoethyl sulfonate, and the like.

As the quaternary ammonium hydroxides and bromides, there may preferably be used choline, tetramethylammonium hydroxide, tetramethylammonium bromide, tetraethylammonium bromide, tetraethylammonium hydroxide, tetraethylammonium bromide, and the like.

Other reducing agents which can be used preferably in the process of the present invention are hydrazine, dextrose, alkali salts of sulfurous acid such as sodium sulfite and potassium sulfite, alkali dithionites such as sodium dithionite and potassium dithionite, oxalic acid and imidazole.

Among these reducing agents, laurylamine, hexamethylenediamine, triethylamine, tri-n-butylamine, triethylenediamine, triethylenetetramine, polyethyleneimine, ethanolamine, n-propanolamine, triethanolamine, tetramethylammonium bromide, tetraethylammonium bromide, tetraethylammonium hydroxide, dextrose, sodium dithionite and potassium dithionite are particularly preferable.

Aromatic amines such as aniline, N-methylaniline, p-aminophenol, diphenylamine, and the like, alkyl secondary amines such as diethylamine, di-n-butylamine, and the like, and quaternary ammonium chloride such as phenyltriethylammonium chloride, tetramethylammonium chloride, tetraethylammonium chloride, and the like cannot be used in the present invention, although they may be analogous to the reducing agents mentioned above. Further such compounds as alicyclic amines, e.g. cyclohexylamine, phenylhydrazine, diphenylhydrazine, ε-caprolactam, thiourea, ammonium sulfate, and the like cannot be used in the present invention.

The amount of the reducing agent used in the process of the present invention is preferably 0.001 to 1% by mole, more preferably 0.01 to 0.5% by mole based on the monomer used. In the case of using a polymeric compound such as polyethyleneimine, the repeating unit is regarded as a molecule. If the amount of the reducing agent is less than 0.001% by mole, effect as an initiator decreases, while if the amount is more than 1% by mole, it is not preferable economically.

The peroxide (a) and the reducing agent (b) may be used in the range of the product of mole percentages of (a) and (b) being 0.00001 to 1, preferably 0.0001 to 1. If the product is less than 0.00001, the effect as an initiator is little, and if the product is more than 1, the molecular weight of the polymer produced is lowered.

As the monomer used in the process of the present invention, there may be used aromatic alkenyl compounds such as styrene, methyl styrene, and alpha-methyl styrene; α,β-unsaturated carboxylic acid ester such as methyl methacrylate, ethyl methacrylate, butyl methacrylate, methyl acrylate, ethyl acrylate, and butyl acrylate; and conjugated diolefins such as butadiene, isoprene, and chloroprene. Among them, styrene, butadiene, isoprene ethylacrylate and methyl methacrylate are particularly preferable.

On the other hand, vinyl acetate, vinyl chloride, vinylidene chloride or the like are hardly polymerized or do not produce a high polymer having extremely high molecular weight. The monomers cannot be used in the process of the present invention.

According to the process of the present invention, if styrene or methyl methacrylate, for example, is polymerized alone, a homopolymer can be obtained. If two or more monomers are polymerized, a copolymer such as a random copolymer or a block copolymer can be obtained. For example, styrene-butadiene copolymer, methyl methacrylate-butadiene copolymer, or the like having extremely high molecular weight and a narrow molecular weight distribution can be produced according to the process of the present invention. If the polymerization is carried out in the presence of two or more monomers, a random copolymer can be obtained. If one monomer is polymerized almost completely and then another monomer is added and the polymerization is continued, a block copolymer can be obtained.

Particularly a block copolymer of an aromatic alkenyl compound and a conjugated diolefin having extremely high molecular weight is a novel copolymer. The novel block copolymer comprising (A) at least one poly (aromatic alkenyl) block having atactic structure with molecular weight ($\overline{M}w$) of 1,000,000 to 30,000,000, and (B) at least one poly (conjugated diolefin) block having microstructure of 15–30% by weight of cis-1,4, 60–75% by weight of trans-1,4 and 10–25% by weight of vinyl structure with molecular weight ($\overline{M}w$) of 50,000 to 10,000,000, the proportion of said poly (aromatic alkenyl) block in the block copolymer being 10 to 95% by weight. The block copolymer may have the poly (aromatic alkenyl) block (A) and the poly (conjugated diolefin) block (B) in the form of A-B, A-B-A, A-B-A-B, B-A-B, or the like. Among these block copolymer, styene-butadiene block copolymer and styrene-isoprene block copolymer are particularly preferable.

Emulsifiers used in the process of the present invention may be of any type, whether anionic, cationic or non-ionic. Particularly non-ionic and anionic emulsifiers are preferable in a viewpoint of giving great polymerization rate. Examples of anionic emulsifiers are fatty acid salts, higher alcohol ester sulfates, aliphatic alcohol ester phosphates, alkyl aryl sulfonates, etc.; examples of non-ionic emulsifiers are polyoxyethylene alkyl ethers, polyoxyethylene alkyl phenol ethers, polyoxyethylene alkyl esters, sorbitan alkyl esters, etc.; and examples of cationic emulsifiers are aliphatic amine salts, quaternary ammonium salts, etc. Among them, sodium dodecylbenzene sulfonate, sodium lauryl sulfate, polyoxyethylene oleyl ether, polyoxyethylene nonyl phenol ether and the like are preferably used. The emulsifier may preferably be used in the range of 0.1 to 10% by weight based on the weight of the monomer used as in the case of conventional emulsion polymerizations.

Since the presence of impurities such as chlorine, phosphoric compounds and the like in the water to be used in the emulsion polymerization is not preferable as in the case of conventional ones, it is preferable to use pure water or deionized water. The water may be used 0.5 to 10 times, preferably 1 to 5 times the weight of the monomer used.

The polymerization is carried out at a temperature of 0° to 70° C., preferably 5° to 60° C. Since the polymerization is carried out in an aqueous system, a temperature lower than 0° C. cannot be used because of freezing. If the temperature is higher than 70° C., the molecular weight of polymers lowers and its distribution broadens.

After the polymerization, a shortstop, an antioxidant, and the like are added to the emulsion and the unreacted monomer is removed according to a conventional method, and the resulting polymer may be used in the form of latex, or conventional techniques of coagulation and drying may be used.

The homopolymer or copolymer prepared by the process of the present invention has super-high molecular weight ($\overline{M}w$) of about 3,000,000 to about 50,000,000 and the ratio of $\overline{M}w/\overline{M}n$ of 1 to 2, preferably 1 to 1.3, wherein $\overline{M}w$ is weight-average molecular weight and $\overline{M}n$ is number-average molecular weight.

The homopolymer or copolymer having super-high molecular weight prepared by the process of the present invention has good moldability and thin film can be produced. A solution of the polymer is remarkably viscous even at a low concentration and good spinnability. The polymer having super-high molecular weight can be used not only as a standard sample in gel permeation chromatography for characterizing high polymers but also as adhesives, films, sheets, paints, molding materials and polymer modifiers for improving mechanical properties by mixing with other polymers.

The super-high molecular weight and narrow molecular weight distribution characters of the polymer produced by the process of the present invention was identified by comparing with the standard samples of polystyrene commercially available in intrinsic viscosity [$\eta$], GPC (gel permeation chromatography) curve and ultracentrifugation.

In the following examples, percents are by weight unless otherwise specified.

EXAMPLES 1–14, COMPARATIVE EXAMPLES 1–11

In a 100-ml branched ampule previously washed and dried and filled with nitrogen, 4.2 ml of styrene, 22.5 ml of an aqueous solution of sodium dodecylbenzene sulfonate (concentration 2.5%) and a peroxide and a reducing agent as listed in Table 1 were placed and the ampule was sealed. The polymerization was carried out for 3 hours while rotating the ampule in a thermostat at 40° C. Then the ampule was opened and 1 ml of an aqueous solution of N,N-diethylhydroxy amine (concentration 0.1 mole/l.) was added to terminate the polymerization. The thus obtained polymer latex was dropped into methanol to precipitate the polymer, which was washed with water sufficiently and dried under reduced pressure to measure yield, intrinsic viscosity [$\eta$] in toluene at 30° C., and gel permeation chromatogram using tetrahydrofuran as a solvent at 35° C. The results are as shown in Table 1.

The attached drawing shows GPC curves of the polystyrene produced by Example 3 (curve I) and the standard sample of polystyrene commercially available having average molecular weight of 5,500,000, and $\overline{M}w/\overline{M}n$=1.06 produced by Pressure Chemical Co., Ltd. (curve II).

As is clear from the results in Table 1, only the peroxides having the structures of dialkyl peroxide and peroxy ester as defined in the present invention can produce the polymer having a narrow molecular weight distribution and super-high molecular weight. Table 1 also shows that too much amount or too less amount of these effective peroxides give unfavorable results.

Table 1

| No. | Peroxide Name | Amount* (mole %) | Reducing agent Name | Amount* (mole %) | Yield (%) | Mol.** weight ($\overline{M}w$ × 10$^{-4}$) | Mol.*** weight distribution | Kind of peroxide |
| --- | --- | --- | --- | --- | --- | --- | --- | --- |
| Comparative | t-Butyl hydroperoxide | 0.5 | Triethylene- | 1.0 | 95 | 30 | ± | Hydro- |

Table 1-continued

| No. | Peroxide Name | Amount* (mole %) | Reducing agent Name | Amount* (mole %) | Yield (%) | Mol.** weight ($\bar{M}w \times 10^{-4}$) | Mol.*** weight distribution | Kind of peroxide |
|---|---|---|---|---|---|---|---|---|
| Example 1 | | | tetramine | | | | | peroxide |
| Comparative Example 2 | p-Menthane hydroperoxide | 0.5 | Triethylenetetramine | 1.0 | 60 | 18 | ± | Hydroperoxide |
| Comparative Example 3 | Cumene hydroperoxide | 0.5 | Triethylenetetramine | 1.0 | 93 | 15 | ± | Hydroperoxide |
| Comparative Example 4 | 2,5-Dimethylhexane-2,5-dihydroperoxide | 0.5 | Triethylenetetramine | 1.0 | 21 | 2 | ± | Hydroperoxide |
| Comparative Example 5 | Benzoyl peroxide | 0.5 | Triethylenetetramine | 1.0 | 0 | — | — | Diacyl peroxide |
| Comparative Example 6 | Acetyl peroxide | 0.5 | Triethylenetetramine | 1.0 | 41 | 55 | ± | Diacyl peroxide |
| Comparative Example 7 | Lauroyl peroxide | 0.5 | Triethylenetetramine | 1.0 | 16 | 13 | ± | Diacyl peroxide |
| Comparative Example 8 | Methyl ethyl ketone | 0.5 | Triethylenetetramine | 1.0 | 0 | — | — | Ketone peroxide |
| Example 1 | Di-t-butyl peroxide | 0.5 | Triethylenetetramine | 1.0 | 95 | 900 | ++ | Dialkyl peroxide |
| Example 2 | Di-cumyl peroxide | 0.5 | Triethylenetetramine | 1.0 | 93 | 570 | ++ | Dialkyl peroxide |
| Example 3 | 2,5-Dimethyl-2,5-di-(t-butylperoxy)-hexane | 0.5 | Triethylenetetramine | 1.0 | 96 | 960 | +++ | Dialkyl peroxide |
| Example 4 | t-Butyl cumyl peroxide | 0.5 | Triethylenetetramine | 1.0 | 87 | 1100 | +++ | Dialkyl peroxide |
| Example 5 | 1,1-Bis(t-butyl-peroxy)3,3,5-trimethyl cyclohexane | 0.5 | Triethylenetetramine | 1.0 | 91 | 530 | ++ | Dialkyl peroxide |
| Example 6 | 2,2-Bis(4,4-di-t-butyl peroxy cyclohexyl)propane | 0.5 | Triethylenetetramine | 1.0 | 75 | 630 | +++ | Dialkyl peroxide |
| Example 7 | 2,5-Dimethyl-2,5-di-(t-butylperoxy)-hexyne-3 | 0.5 | Triethylenetetramine | 1.0 | 96 | 450 | ++ | Dialkyl peroxide |
| Example 8 | Di-t-butyl diperoxyphthalate | 0.5 | Triethylenetetramine | 1.0 | 84 | 470 | ++ | Peroxy ester |
| Example 9 | t-Butyl peroxymaleic acid | 0.5 | Triethylenetetramine | 0.1 | 90 | 780 | +++ | Peroxy ester |
| Example 10 | t-Butyl peroxymaleic acid | 0.5 | Triethylamine | 0.1 | 85 | 710 | +++ | Peroxy ester |
| Example 11 | t-Butyl peroxymaleic acid | 0.1 | Polyethyleneimine | 0.5 | 89 | 1300 | +++ | Peroxy ester |
| Example 12 | t-Butyl peroxy 2-ethylhexanoate | 0.5 | Triethylenetetramine | 1.0 | 91 | 760 | ++ | Peroxy ester |
| Example 13 | t-Butyl peroxy isopropylcarbonate | 0.05 | Triethylenetetramine | 1.0 | 92 | 1200 | ++ | Peroxy ester |
| Example 14 | t-Butyl peroxy isopropylcarbonate | 0.005 | Triethylenetetramine | 1.0 | 81 | 4300 | +++ | Peroxy ester |
| Comparative Example 9 | t-Butyl peroxy isopropylcarbonate | 3.0 | Triethylenetetramine | 0.5 | 96 | 80 | ± | Peroxy ester |
| Comparative Example 10 | t-Butyl peroxy isopropylcarbonate | 2.0 | Triethylenetetramine | 1.0 | 97 | 89 | ± | Peroxy ester |
| Comparative Example 11 | t-Butyl peroxy isopropylcarbonate | 0.00005 | Triethylenetetramine | 0.1 | nil | — | — | Peroxy ester |

Note
*: Based on the monomer used.
**: Molecular weight was calculated from intrinsic viscosity.
***: Molecular weight distribution was determined by GPC comparing with three standard samples of polystyrene.
Sample (a): Pressure Chemical Co., Ltd. $\bar{M}w = 550 \times 10^4$, $\bar{M}w/\bar{M}n = 1.06$
Sample (b): National Bureau of Standards. $\bar{M}w = 26 \times 10^4$, $\bar{M}w/\bar{M}n = 2.1$
Sample (c): National Physical Laboratory. $1 \times 10^4 < \bar{M}w < 150 \times 10^4$, $\bar{M}w/\bar{M}n = 3.5$
+++: equal to or narrower than Sample (a)
++: broader than Sample (a) but narrower than Sample (b)
+: broader than Sample (b) but narrower than Sample (c)
±: equal to or broader than Sample (c)

EXAMPLES 15-47, COMPARATIVE EXAMPLES 12-27

In a 100-ml branched ampule previously washed and dried and filled with nitrogen, 4.2 ml of styrene, 22.5 ml of an aqueous solution of polyoxyethylene oleyl ether (concentration 1.5%) and a peroxide and a reducing agent as listed in Table 2 were placed and the ampule was sealed. The polymerization was carried out for 4 hours while rotating the ampule at 25° C. Then the ampule was opened and 1 ml of an aqueous solution of N,N-diethylhydroxylamine (concentration 0.1 mole/l.) was added to terminate the polymerization. The thus obtained polymer latex was dropped into methanol to precipitate the polymer, which was washed with water sufficiently and dried under reduced pressure to carry out the same measurements as described in Example 1. The results are as shown in Table 2.

As is clear from Table 2, such reducing agents as alkyl primary amines, alkyl tertiary amines, alkylamino alcohols, polyethyleneimine, alkyl primary amino sulfonic acids or alkali salts thereof, quaternary ammonium hydroxides or bromides, hydrazine, dextrose, alkali salts of sulfurous acid, alkali dithionites, oxalic acid and imidazole are effective for producing high polymers having super-high molecular weight and a narrow molecular weight distribution.

Table 2

| No. | Peroxide Name | Amount (mole %) | Reducing agent Name | Amount (mole %) | Yield (%) | Mol. weight ($\bar{M}w \times 10^{-4}$) | Mol. weight distribution |
|---|---|---|---|---|---|---|---|
| Comparative Example 12 | B | 0.5 | Ferrous chloride | 1.0 | nil | | |
| Comparative Example 13 | " | " | Ferrous sulfate | " | " | | |
| Comparative Example 14 | " | " | Aniline | " | " | | |
| Comparative Example 15 | " | " | Methylaniline | " | " | | |
| Comparative Example 16 | " | " | Sodium thiosulfate | " | " | | |
| Comparative Example 17 | " | " | Cobalt naphthenate | " | " | | |
| Comparative Example 18 | " | " | Hydroquinone | " | " | | |
| Comparative Example 19 | " | " | { Sodium ferricyanide / Sodium pyrophosphate | 0.5 / 0.5 | 80 | 18 | ± |
| Comparative Example 20 | " | " | Phenylhydrazine | 1.0 | nil | | |
| Comparative Example 21 | " | " | Tetraethylammonium chloride | " | " | | |
| Comparative Example 22 | " | " | Thiourea | " | " | | |
| Comparative Example 23 | " | " | p-Aminophenol | " | " | | |
| Comparative Example 24 | " | " | Cyclohexylamine | " | " | | |
| Comparative Example 25 | " | " | Diethylamine | 1.0 | nil | | |
| Comparative Example 26 | " | " | Di-n-butylamine | " | " | | |
| Example 15 | " | " | Triethylenediamine | " | 78 | 1800 | +++ |
| Example 16 | " | " | Ethanolamine | " | 73 | 1100 | +++ |
| Example 17 | " | " | Triethanolamine | " | 69 | 950 | ++ |
| Example 18 | " | " | n-Propanolamine | " | 70 | 1300 | +++ |
| Example 19 | " | " | Tetraethylhydroxylamine | " | 85 | 530 | +++ |
| Example 20 | " | " | Ethylamine | " | 83 | 420 | ++ |
| Example 21 | " | " | Hydrazine | " | 90 | 350 | ++ |
| Example 22 | " | " | Tetraethylammonium bromide | " | 60 | 630 | +++ |
| Example 23 | " | " | Aminoethyl sulfonate | " | 53 | 730 | ++ |
| Example 24 | " | " | Oxalic acid | " | 55 | 550 | ++ |
| Example 25 | " | " | Sodium aminoethyl sulfonate | " | 52 | 470 | ++ |
| Example 26 | " | " | Diethylenetriamine | " | 49 | 620 | ++ |
| Example 27 | B | 0.5 | Sodium sulfite | 1.0 | 52 | 760 | ++ |
| Example 28 | " | " | Potassium sulfite | " | 53 | 830 | ++ |
| Example 29 | " | " | Imidazole | " | 52 | 990 | ++ |
| Example 30 | " | " | Dextrose | " | 49 | 1200 | +++ |
| Example 31 | " | 1.0 | Triethylometetramine | 1.0 | 93 | 1300 | +++ |
| Example 32 | " | 0.5 | Sodium dithionite | 0.5 | 90 | 860 | +++ |
| Example 33 | M | " | n-Tributylamine | 0.2 | 60 | 1800 | +++ |
| Example 34 | " | " | Polyethyleneimine | " | 92 | 3300 | +++ |
| Example 35 | I | 0.025 | Triethylenetramine | 1.0 | 95 | 890 | +++ |
| Example 36 | " | 0.0005 | Sodium dithionite | 0.1 | 83 | 2300 | +++ |
| Example 37 | " | 0.01 | " | 0.0015 | 37 | 4800 | +++ |
| Example 38 | B | 0.05 | " | 0.0015 | 60 | 2200 | +++ |
| Example 39 | " | 0.5 | Laurylamine | 0.5 | 89 | 860 | +++ |
| Example 40 | " | " | Trimethylenediamine | " | 75 | 450 | ++ |
| Example 41 | B | 0.5 | Hexamethylenediamine | 0.5 | 69 | 660 | +++ |
| Example 42 | " | " | Tetramethylammonium hydroxide | " | 83 | 730 | ++ |
| Example 43 | " | " | Tetramethylammonium bromide | " | 76 | 1050 | +++ |
| Example 44 | " | 0.01 | Triethylenetramine | 0.01 | 70 | 1680 | +++ |
| Comparative Example 27 | " | " | " | 0.0005 | nil | | |
| Example 45 | M | 0.001 | " | 0.01 | 23 | 2500 | +++ |
| Example 46 | " | 0.01 | " | 0.01 | 42 | 1900 | +++ |

Table 2-continued

| | Peroxide | | Reducing agent | | | | |
|---|---|---|---|---|---|---|---|
| No. | Name | Amount (mole %) | Name | Amount (mole %) | Yield (%) | Mol. weight ($\overline{M}w \times 10^{-4}$) | Mol. weight distribution |
| Example 47 | " | 0.1 | " | 0.1 | 59 | 1100 | +++ |

Note
B: 2,5-Dimethyl-2,5-di(t-butyl peroxy)hexane
M: t-Butyl peroxymaleic acid
I: t-Butyl peroxy isopropyl carbonate
The other marks or signs are the same as defined in Note of Table 1.

EXAMPLES 48–55, COMPARATIVE EXAMPLES 28–30

Using the same procedure as described in Example 1, but using as a peroxide 0.5% by mole of 2,5-dimethyl-2,5-di(t-butylperoxy)hexane based on the monomer used, as a reducing agent 1.0% by mole of triethyltetramine based on the monomer used, and a monomer as listed in Table 3, the polymerization was carried out for 24 hours. The results are as shown in Table 3.

As is clear from Table 3, vinyl acetate, vinyl chloride and vinylidene chloride, which can be polymerized in a usual emulsion polymerization, are not polymerized.

Table 3

| No. | Monomer | Yield (%) | Mol. weight ($\overline{M}w \times 10^{-4}$) | Mol. weight distribution |
|---|---|---|---|---|
| Example 48 | α-Methyl styrene | 91 | 450 | ++ |
| Example 49 | Methyl methacrylate | 89 | 990 | +++ |
| Example 50 | Butadiene | 95 | 2500 | +++ |
| Example 51 | Isoprene | 90 | 1300 | +++ |
| Example 52 | p-Methyl styrene | 89 | 2100 | +++ |
| Example 53 | Methyl acrylate | 97 | 800 | ++ |
| Example 54 | Ethyl acrylate | 91 | 730 | +++ |
| Example 55 | Chloroprene | 85 | 1300 | ++ |
| Comparative Example 28 | Vinyl acetate | 0 | | |
| Comparative Example 29 | Vinyl chloride | 0 | | |
| Comparative Example 30 | Vinylidene chloride | 0 | | |

Note
Marks or signs are the same as defined in Note of Table 1.

EXAMPLE 56

In a 200-ml branched ampule previously washed and dried and filled with nitrogen, 4.2 ml of styrene, 12.6 ml of isoprene, 50 ml of an aqueous solution of sodium dodecylbenzene sulfonate (concentration 0.6 mole/l.) were placed and the contents were stirred. Then 0.2 mmole of 2,5-dimethyl-2,5-di(t-butylperoxy)hexane was added to the resulting mixture and the ampule was sealed. The polymerization was carried out for 3 hours while rotating the ampule in a water bath maintained at 5° C. Then the ampule was opened and 1 ml of N,N-diethylhydroxylamine aqueous solution (concentration 0.1 mole/l.) was added to terminate the polymerization. The resulting polymer was treated as described in Example 1 and the physical properties of the polymer were measured according to Example 1.

That the resulting polymer was the copolymer was identified by infrared absorption spectra and NMR spectra, which show spectra of the polymers of styrene and isoprene, and by differential scanning calorimetry, which showed glass transition temperature of −26° C. but did not show the glass transition temperatures of polystyrene and polyisoprene.

The results of GPC measurement showed that weight-average molecular weight was about 7,600,000 and the ratio of $\overline{M}w/\overline{M}n$ was 1.15.

EXAMPLE 57

In a 500-ml three necked flask, 190 ml of water, 8 g of sodium lauryl sulfate and 0.5 g of polyethyleneimine were placed under nitrogen with sufficient stirring. After dissolved, 100 ml of styrene and 0.01 g of t-butyl peroxyacetate were added to the solution and the polymerization was carried out at 37° C. for 4 hours. The resulting polymer was treated as described in Example 1. The yield was 97%. The intrinsic viscosity in toluene at 30° C. was 17.2. The molecular weight distribution was very narrow and the ratio of $\overline{M}w/\overline{M}n$ was 1.03 assuming that sedimentation constant b obtained by ultracentrifugation was $S = 1.5 \times 10^{-15} M^{0.5}$.

EXAMPLES 58 AND 59, COMPARATIVE EXAMPLES 31 AND 32

The polymerization of Example 57 was repeated except for changing the polymerization temperature as listed in Table 4. The polymer obtained was treated as described in Example 1. The results are as shown in Table 4.

As is clear from Table 4, the polymerizations over 70° C. do not afford polymers having super-high molecular weight and the molecular weight distributions are remarkably broad.

Table 4

| No. | Polymerization temperature (°C.) | Yield (%) | Mol. weight ($\overline{M}w \times 10^{-4}$) | Mol. weight distribution |
|---|---|---|---|---|
| Example 58 | 55 | 71 | 560 | +++ |
| Example 59 | 65 | 83 | 350 | ++ |
| Comparative Example 31 | 75 | 98 | 120 | + |
| Comparative Example 32 | 90 | 100 | 19 | ± |

Note
Marks or signs are the same as defined in Note of Table 1.

EXAMPLE 60

In a 500-ml pressure bottle previously washed and dried, 50 g of styrene, 10 g of polyoxyethylene nonyl phenol ether, 0.5 g of triethylenetetramine and 200 ml of distilled water were placed under nitrogen with stirring. After emulsified, 0.01 g of t-butyl peroxybenzoate was added to the resulting mixture and the polymerization was carried out under nitrogen at 40° C. for 6 hours with stirring. Then 34 g of butadiene was added to the polymerization system and the polymerization was continued at 40° C. for 24 hours. Then 1 ml of an aqueous solution of N,N-diethylhydroxylamine (concentration 0.1 mole/l.) was added to terminate the polymerization. The polymer latex thus obtained was treated as described in Example 1 and the resulting polymer was used to measure physical properties, i.e. intrinsic viscosity [η] in toluene at 30° C., Schlielen pattern of tetrahydrofuran solution, glass transition temperature (Tg) using a differential scanning calorimeter (heating rate 20° C./min), and infrared absorption spectra of cast film.

For reference, using the same conditions as mentioned above, styrene alone was polymerized for 6 hours and the polymerization was terminated by adding 1 ml of an aqueous solution of N,N-diethylhydroxylamine (concentration 0.1 mole/l.). Then the polymer latex was dropped into methanol and the polystyrene was recovered as mentioned above. The polystyrene had intrinsic viscosity [η] in toluene at 30° C. of 9.0 and weight-average molecular weight of 6,000,000. Schlielen pattern of the polystyrene was also measured as mentioned above.

The copolymer obtained in Example 60 was a block copolymer having intrinsic viscosity [η] of 13.7, the yield being 97%. Glass transition temperature of the copolymer was −92° C. and 94° C. which correspond to Tg of the polybutadiene block and the polystyrene block, respectively. The infrared absorption spectra showed that the polystyrene block had atactic structure and the polystyrene content was 60%, and that the polybutadiene block had microstructure of 18% of cis-1,4 structure, 66% of trans-1,4 structure, and 16% of vinyl structure. The copolymer produced was identified as a pure block copolymer by the GPC and thin layer chromatograph. The Schlielen pattern of the copolymer showed that the molecular weight distribution of the copolymer was considerably narrow and that the copolymer was a block copolymer since there was one peak in the higher molecular weight side comparing with the Schlielen pattern of the polystyrene obtained before the copolymerization as mentioned above.

What is claimed is:

1. A block copolymer of an aromatic alkenyl compound and a conjugated diolefin having extremely high molecular weight comprising
    (A) at least one poly (aromatic alkenyl) block having atactic structure with molecular weight ($\overline{M}w$) of 1,000,000 to 30,000,000, and
    (B) at least one poly (conjugated diolefin) block having microstructure of 15–30% by weight of cis-1,4, 60–75% by weight of trans-1,4 and 10–25% by weight of vinyl structure with molecular weight ($\overline{M}w$) of 50,000 to 10,000,000, the proportion of said poly (aromatic alkenyl) block in the block copolymer being 10 to 95% by weight.

2. A block copolymer according to claim 1, wherein the aromatic alkenyl compound is styrene and the conjugated diolefin is butadiene or isoprene.

* * * * *